US008324770B2

(12) United States Patent  (10) Patent No.: US 8,324,770 B2
Gupta et al.  (45) Date of Patent: Dec. 4, 2012

(54) ELECTRIC MOTOR APPARATUS

(75) Inventors: Sanjay Gupta, Hyderabad Andhra Pradesh (IN); Ragidimilli Venkata Bahaskara Sreeramachandra Murty, Hyderabad Andhra Pradesh (IN); Ravi Kumar Musinana, Hyderabad Andhra Pradesh (IN); Mandar Ranganath Rai, Hyderabad Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 256 days.

(21) Appl. No.: 12/847,318

(22) Filed: Jul. 30, 2010

(65) Prior Publication Data

US 2012/0025632 A1 Feb. 2, 2012

(51) Int. Cl.
H02K 3/00 (2006.01)
(52) U.S. Cl. .......................................................... 310/71
(58) Field of Classification Search ................ 310/68 R; 362/100, 154, 155, 183, 200; 126/572, 640, 126/684, 696
See application file for complete search history.

(56) References Cited

U.S. PATENT DOCUMENTS

| 3,892,911 | A | | 7/1975 | Codrino | |
|---|---|---|---|---|---|
| 4,365,615 | A | * | 12/1982 | Melvin | 126/572 |
| 4,649,304 | A | | 3/1987 | Atherton et al. | |
| 4,661,660 | A | | 4/1987 | von Sothen et al. | |
| 4,908,742 | A | * | 3/1990 | Kersey | 362/156 |
| 5,813,749 | A | * | 9/1998 | Sheldon | 362/155 |
| 6,033,084 | A | * | 3/2000 | Burke | 362/155 |
| 6,198,050 | B1 | | 3/2001 | Blalock | |
| 6,220,901 | B1 | | 4/2001 | Fisher et al. | |
| 6,274,811 | B2 | | 8/2001 | Blalock | |
| 6,528,021 | B1 | * | 3/2003 | Williams | 422/121 |
| 6,672,736 | B2 | * | 1/2004 | Waldman | 362/155 |
| 6,824,432 | B2 | | 11/2004 | Katsuzawa et al. | |

FOREIGN PATENT DOCUMENTS

| EP | 0139450 A1 | 5/1985 |
|---|---|---|
| WO | 02/45243 A1 | 6/2002 |

* cited by examiner

*Primary Examiner* — Tran Nguyen
(74) *Attorney, Agent, or Firm* — Cantor Colburn LLP

(57) ABSTRACT

An apparatus is provided and includes a load, circuitry coupled to the load for turning the load on and off, a conduit box through which electricity is transmitted to the load to power the load when the load is turned on, the conduit box including a conduit box body formed to define an aperture and a cover, which closes the aperture when the cover is disposed at a predefined position relative to the conduit box body and a system by which the conduit box body and the cover are operably coupled to the circuitry to provide transmission of the electricity through the conduit box when the load is turned on only when the cover is disposed at the predefined position relative to the conduit box body.

17 Claims, 5 Drawing Sheets

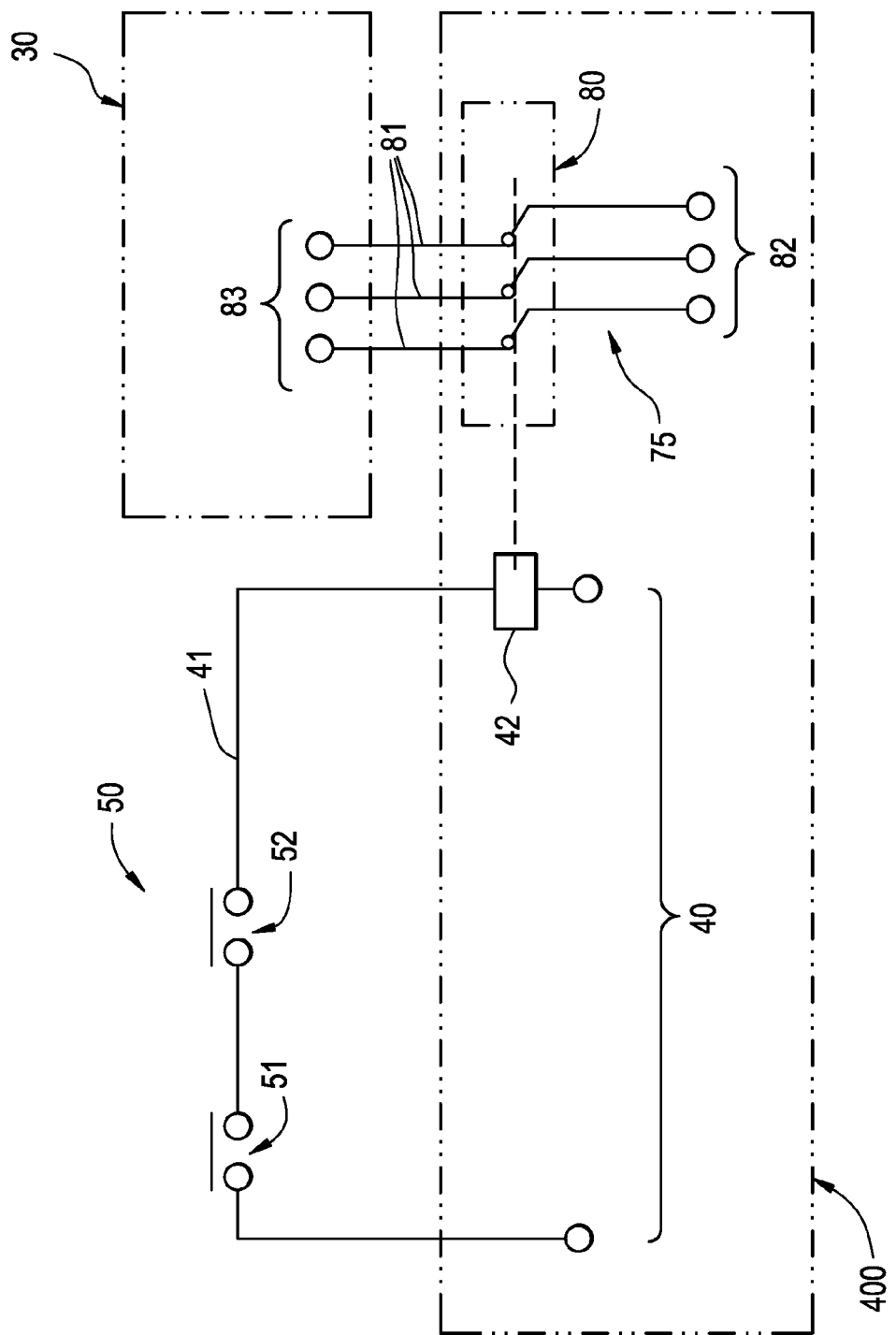

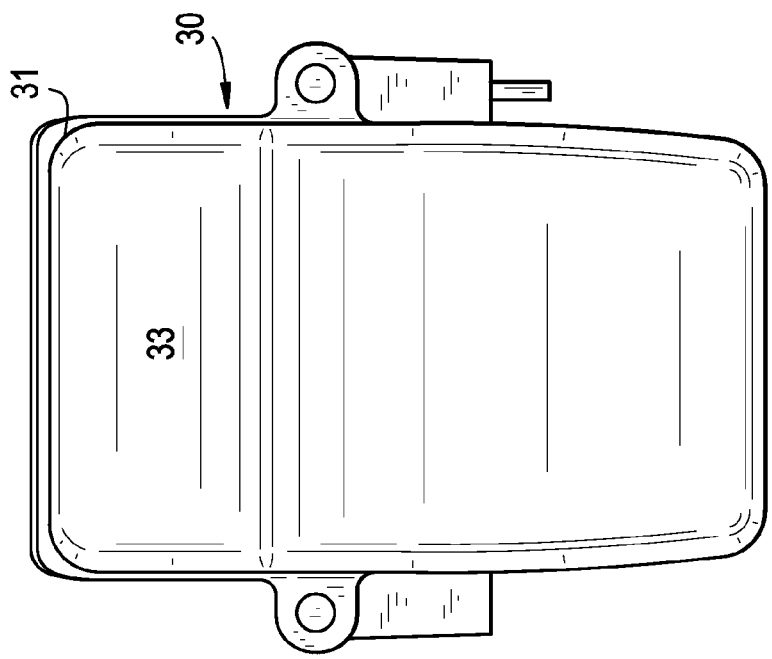
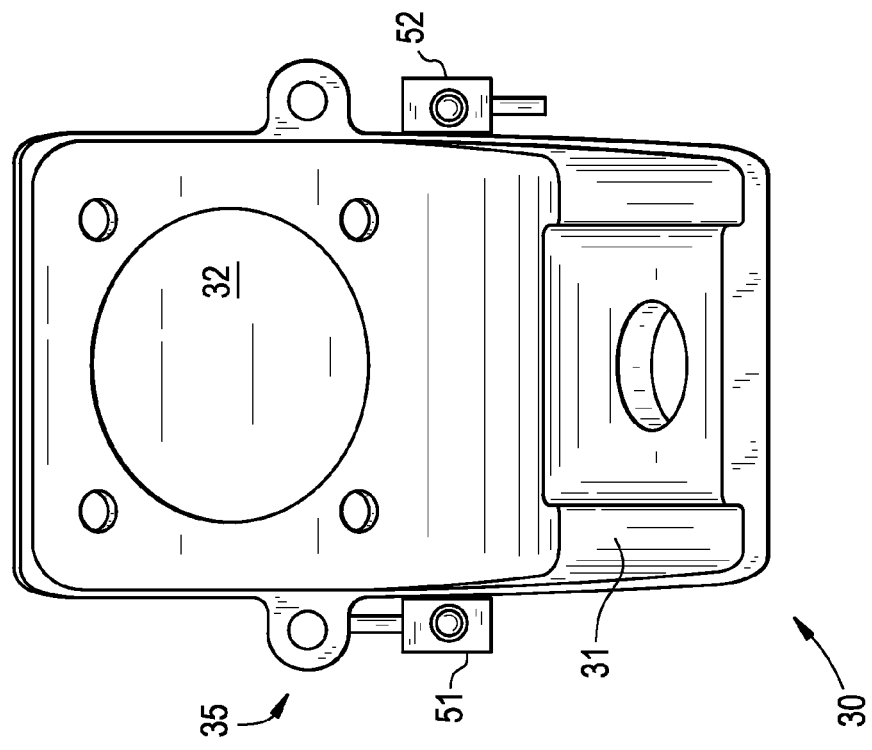

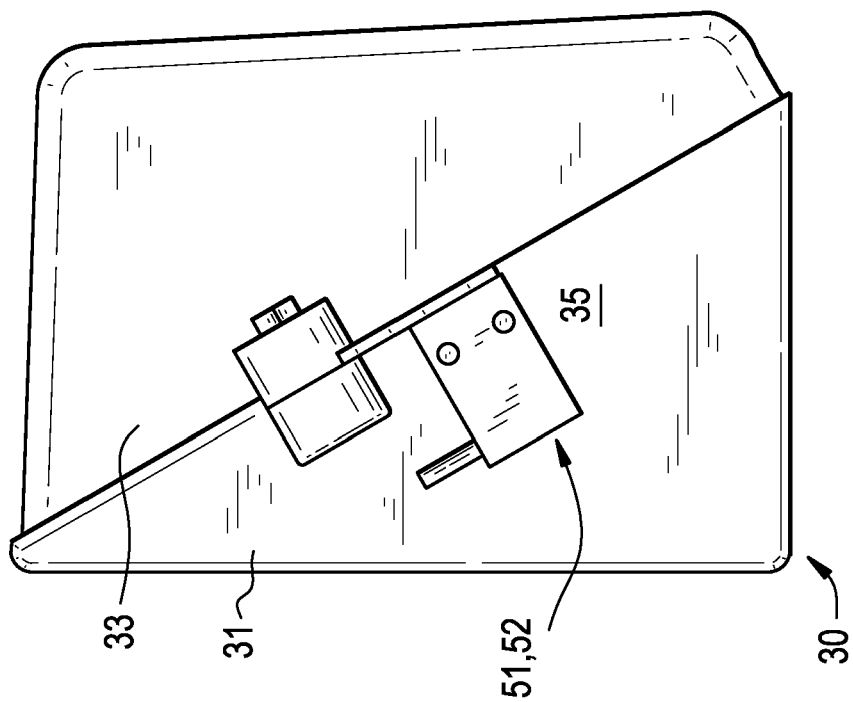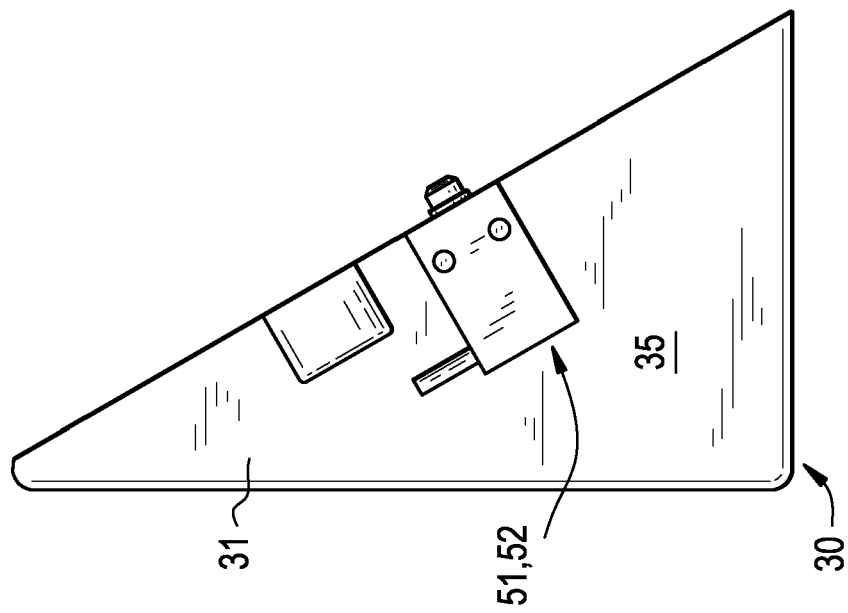

ELECTRIC MOTOR APPARATUS

BACKGROUND OF THE INVENTION

The subject matter disclosed herein relates to electric motors and, more particularly, to an apparatus to prevent electric shock in industrial electric motors.

In industrial motors, live power supplying cables are often terminated to motor winding leads inside a conduit (terminal) box. The continued supply of power to these cables is not typically coupled to the open/closed state of the box. Therefore, if an individual opens the conduit box cover without switching off the motor, it is likely that the power supply cables will remain live. The individual may then come in contact with live terminals, which can potentially cause an unpleasant electric shock to him.

With this in mind, many factories employ lock-out or tag-out practices. These and/or others may also use insulated terminals.

BRIEF DESCRIPTION OF THE INVENTION

According to one aspect of the invention, an apparatus is provided and includes a load, circuitry coupled to the load for turning the load on and off, a conduit box through which electricity is transmitted to the load to power the load when the load is turned on, the conduit box including a conduit box body formed to define an aperture and a cover, which closes the aperture when the cover is disposed at a predefined position relative to the conduit box body and a system by which the conduit box body and the cover are operably coupled to the circuitry to provide transmission of the electricity through the conduit box when the load is turned on only when the cover is disposed at the predefined position relative to the conduit box body.

According to another aspect of the invention, an electric motor apparatus is provided and includes an electric motor, a power circuit to provide electricity to the electric motor, a motor control circuit coupled to the electric motor and including a circuit breaker coil, which is coupled to the power circuit and configured to occupy first and second states for permitting and preventing the provision of the electricity to the electric motor, a conduit box through which the electricity is transmitted to the electric motor when the circuit breaker occupies the first state, the conduit box including a conduit box body formed to define an aperture and a cover, which closes the aperture when the cover is disposed at a predefined position relative to the conduit box body and a system connected in series between the electric motor and the circuit breaker coil by which the conduit box body and the cover are operably coupled to the motor control circuit to prevent transmission of the electricity through the conduit box when the circuit breaker coil occupies the first state and the cover is disposed at a position other than the predefined position.

According to yet another aspect of the invention, an electric motor apparatus is provided and includes an electric motor, circuitry coupled to the electric motor for turning the electric motor on and off, a conduit box through which electricity is transmitted to the electric motor to power the electric motor when the electric motor is turned on, the conduit box including a conduit box body formed to define an aperture and a cover, which is attachable to the conduit box body for aperture closure and first and second switches connected in series along the circuitry, which are mechanically timed in accordance with an attachment state of the cover with respect to the conduit box body to prevent or permit transmission of the electricity through the conduit box based on whether the cover is attached to the conduit box body regardless of whether the electric motor is turned on or off.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is a schematic diagram of a motor control circuit;

FIGS. 3 and 4 are plan views of a conduit box of the electric motor of FIG. 1;

FIGS. 5 and 6 are side views of the conduit box of FIGS. 3 and 4;

The detailed description explains embodiments of the invention, together with advantages and features, by way of example with reference to the drawings.

DETAILED DESCRIPTION OF THE INVENTION

A feature is provided herein to turn off an electric motor as soon as a conduit box of the electric motor is opened. In addition, the motor will not be able to be restarted until the conduit box is closed.

Figure 1:
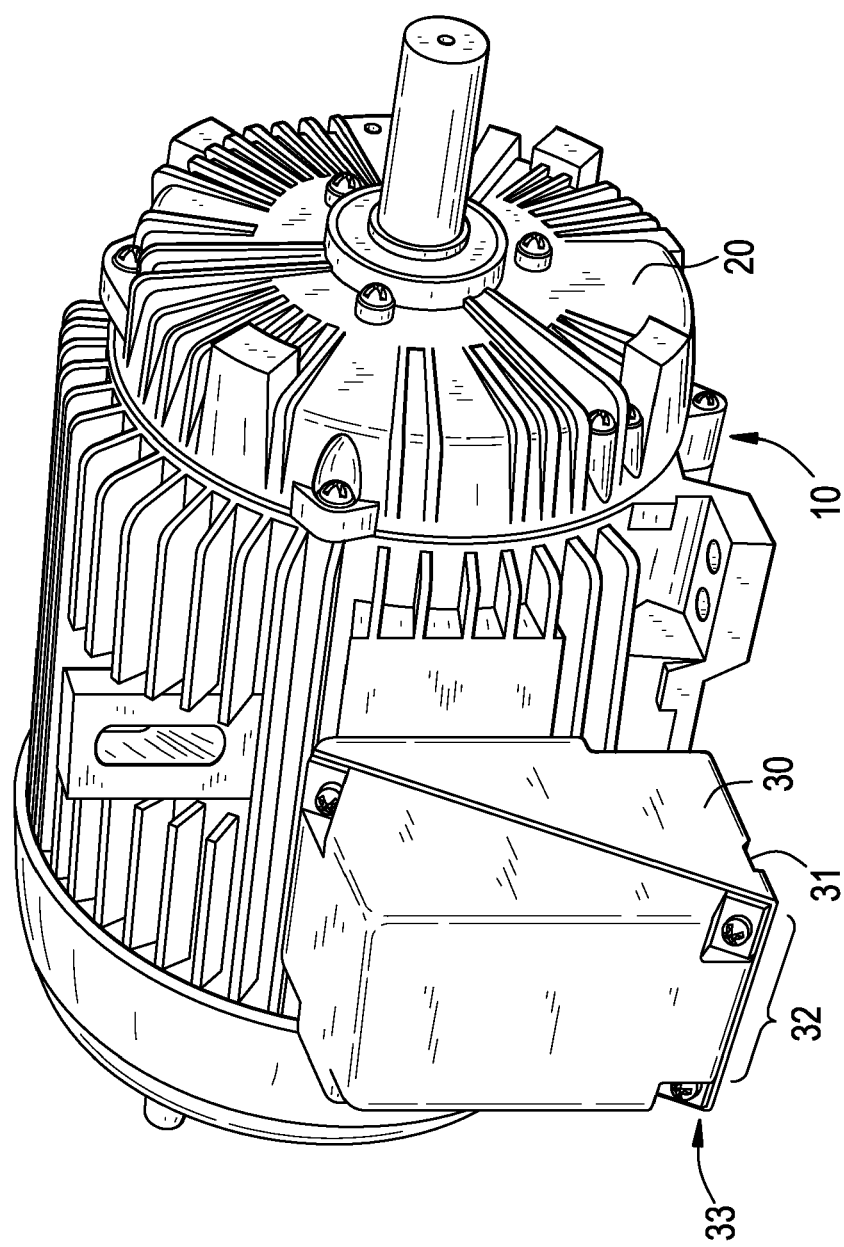
FIG. 1 is a perspective view of an electric motor.

With reference to FIG. 1, an electric motor apparatus 10 (hereinafter referred to as "an apparatus 10") is provided and includes a load, such as an electrically powered electric motor 20 (hereinafter referred to as "electric motor 20"), and a conduit box 30 through which electricity is transmitted to the electric motor 20. This electricity powers the electric motor 20 when the electric motor 20 is turned on. The electric motor 20 may be a single phase motor or a three phase motor and may be rated to any voltage, such as, for example, 110 volts to 13.8 k volts. The conduit box 30 may be of any shape and size and may include a conduit box body 31, which is formed to define an aperture 32, and a cover 33. The cover 33 is attachable to the conduit box body 31 to close the aperture 32 as shown.

In some embodiments, the attachment of the cover 33 to the conduit box body 31 in order to close the aperture 32 is achieved by disposing or mounting the cover 33 at a predefined position relative to the conduit box body 31 and securing or bolting the cover 33 in that predefined position. Any other positioning or securing state of the cover 33 with respect to the conduit box body 31 will generally not achieve aperture 32 closure. In these or other embodiments, the cover 33 may be further connected to the conduit box body 31 by a hinge or some other similar device allowing the aperture 32 to be opened while preventing complete removal of the cover 33 from the conduit box body 31.

With reference to FIG. 2, the apparatus 10 further includes a motor control circuit 40 and a power circuit 75. The power circuit 75 supplies power or electricity to the electric motor 20 and the motor control circuit 40 controls operations of the power circuit 75. As shown in FIG. 2, the motor control circuit 40 and the power circuit 75 may be partially housed in a power supply panel or a motor control center (MCC) 400 along with a circuit breaker 80, which is a component of the power circuit 75. The motor control circuit 40 includes a control circuit cable 41 and a circuit breaker coil 42.

The circuit breaker 80 is disposed in electrical communication with the power cables 81 between first leads 82, which may be housed in the MCC 400, and second leads 83, which may be housed in the conduit box 30, and which may be connectable to the electric motor 20. The circuit breaker 80 is operably coupled to the circuit breaker coil 42 such that when the circuit breaker coil 42 is selectively energized or un-energized, the circuit breaker 80 selectively occupies on and off states, respectively. By occupying the on and off states in this manner, the circuit breaker 80 thereby regulates provision of the electricity to the power cables 81 such that the electric motor 20 can be powered when turned on and powered down when turned off.

Still referring to FIG. 2, the apparatus 10 further includes a system 50 by which the cover 33 and the conduit box body 31 are operably coupled to the motor control circuit 40 to prevent transmission of the electricity along the power cables 81 and through the conduit box 30 when the aperture 32 of the conduit box 30 is opened. That is, the system 50 is configured to cease the provision of electricity through the circuit breaker 80 and to the electric motor 20 when the aperture 32 of the conduit box 30 is opened by the removal of the cover 33 from the mounted and bolted predefined position relative to the conduit box body 31.

The system 50 is further configured to prevent start-up of the electric motor 20 until the aperture 32 is once again closed. As shown in FIG. 2, the system 50 includes normally open (NO) first and second switches, such as limit switches 51 and 52, which are disposed in electrical communication with the motor control circuit 40 in series with respect to one another and in series between the electric motor 20 and the circuit breaker coil 42. Since the first and second limit switches 51 and 52 are in series with one another, each one acts as a redundant backup switch in case the other fails.

With reference to FIGS. 3-6, the first and second limit switches 51 and 52 are mounted on an outer surface 35 of the conduit box body 31. When the cover 33 is attached to the conduit box body 31 in the manner described above, the first and second limit switches 51, 52 are forcibly closed. In this state, the motor control circuit 40 is closed and the circuit breaker coil 42 is energized. With the circuit breaker coil 42 energized, the circuit breaker coil 42 causes the circuit breaker 80 to occupy the on state and electricity can be transmitted to the electric motor 20.

By contrast, when the cover 33 is removed from the conduit box body 31 in the manner described above, the first and second limit switches 51 and 52 are permitted to occupy their natural normally open (NO) condition whereby the motor control circuit 40 is opened such that the circuit breaker coil 42 is un-energized. With the circuit breaker coil 42 un-energized, the circuit breaker coil 42 causes the circuit breaker 80 to occupy the off state and electricity cannot be transmitted to the electric motor 20. The circuit breaker coil 42 will then remain un-energized until the cover 33 is re-attached to the conduit box body 31 and, hence, the circuit breaker 80 will continue to occupy the off state such that electricity will continue to be prevented from being transmitted to the electric motor 20. Thus, since the power cables 81 are prevented from carrying electricity with the cover 33 removed from the conduit box body 31, operator contact with the power cables 81 while the cover 33 is removed from the conduit box body 31 has no effect.

In accordance with embodiments, the first and second limit switches 51 and 52 are mechanically timed to remain open until full closure of the aperture 32 is achieved by the mounting and the bolting of the cover 33 in the predefined position relative to the conduit box body 31.

Figure 7:
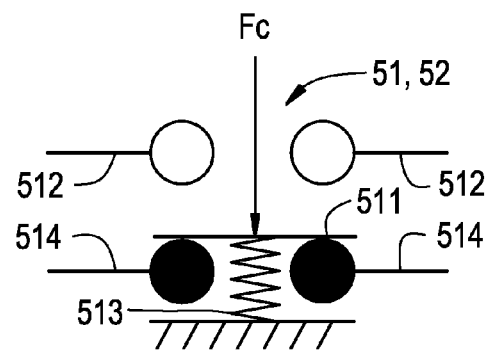
FIG. 7 is a schematic diagram of a limit switch.

With reference to FIG. 7, the first and second limit switches 51 and 52 may each include a spring loaded lead 511, stoppers 512 to support the lead 511 in the NO condition, an elastic element 513 to urge the lead 511 toward and against the stoppers 512 and terminals 514. As shown in FIG. 7, when a force, $F_C$, is applied to the lead by the attachment of the cover 33 to the conduit box body 31, the lead 511 is forced into contact with the terminals 514 to close the motor control circuit 40. In those embodiments in which the first and second limit switches 51 and 52 are mechanically timed to remain open until full closure of the aperture 32 is achieved by the mounting and the bolting of the cover 33 in the predefined position relative to the conduit box body 31, it is noted that the lead 511, the stoppers 512, the elastic element 513 and the terminals 514 may be arranged relative to one another and configured such that the force, $F_C$, does not force the lead 511 into contact with the terminals 514 until the full closure is achieved. This may be achieved by, for example, separating the stoppers 512 from the terminals 514 by a distance that is sufficient to maintain separating between the lead 511 and the terminals until the final bolting of the cover 33 to the conduit box body 31.

Figure 8:
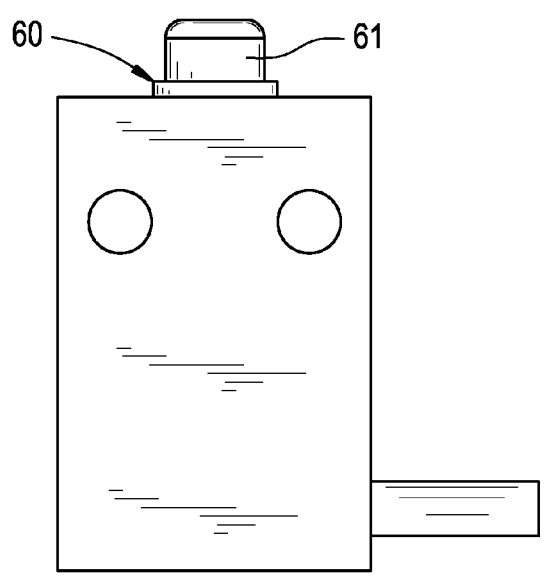
FIG. 8 is a side view of a cam-type limit switch.
Figure 9:
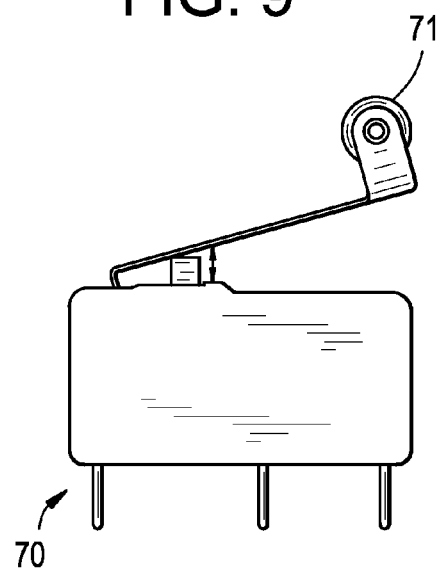
FIG. 9 is a side view of a roller-type limit switch.

With reference to FIGS. 8 and 9, one of the first and second limit switches 51 and 52 may be a cam-type switch 60, a roller-type switch 70 or any other similar type of switch. Where the cam-type switch 60 is employed, the cover 33 impinges upon a spring-loaded knob 61 or a cam in order to close the switch. The roller-type switch 70 may be employed to similar effect but is additionally useful where the roller 71 facilitates translational motion of the cover 33 relative to the conduit box body 31, which is performed as part of the attachment process.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus, comprising:
   a load;
   circuitry coupled to the load for turning the load on and off;
   a conduit box through which electricity is transmitted to the load to power the load when the load is turned on, the conduit box including a conduit box body formed to define an aperture and a cover, the cover being configured to close the aperture when the cover is disposed at a predefined position relative to the conduit box body; and
   a system by which the conduit box body and the cover are operably coupled to the circuitry to provide transmission of the electricity through the conduit box when the load is turned on only when the cover is disposed at the predefined position relative to the conduit box body such that the cover thereby closes the aperture.

2. The apparatus according to claim 1, wherein the circuitry comprises:

power cables at least partially housed in the conduit box to transmit the electricity to the load; and a circuit breaker, coupled to the power cables, to selectively occupy on and off states regulating provision of the electricity to the power cables for turning the load on and off.

3. The apparatus according to claim 1, wherein the system comprises first and second switches connected in series along the circuitry, the first and second switches being normally open and closed only when the cover closes the aperture.

4. The apparatus according to claim 3, wherein the first and second switches are disposed at an exterior of the conduit box.

5. The apparatus according to claim 3, wherein at least one of the first and second switches comprises a cam switch.

6. The apparatus according to claim 5, wherein the cam switch comprises a spring loaded knob.

7. The apparatus according to claim 3, wherein at least one of the first and second switches comprises a roller switch.

8. An electric motor apparatus, comprising:
an electric motor;
a power circuit to provide electricity to the electric motor;
a motor control circuit coupled to the electric motor and including a circuit breaker coil, the circuit breaker coil being coupled to the power circuit and configured to occupy first and second states for permitting and preventing the provision of the electricity to the electric motor;
a conduit box through which the electricity is transmitted to the electric motor when the circuit breaker occupies the first state, the conduit box including a conduit box body formed to define an aperture and a cover, the cover being configured to close the aperture when the cover is disposed at a predefined position relative to the conduit box body; and
a system connected in series between the electric motor and the circuit breaker coil by which the conduit box body and the cover are operably coupled to the motor control circuit to prevent transmission of the electricity through the conduit box when the circuit breaker coil occupies the first state and the cover is disposed at a position other than the predefined position such that the cover is not disposed to close the aperture.

9. The electric motor apparatus according to claim 8, wherein the motor control circuit comprises a control circuit cable to which the circuit breaker coil is coupled.

10. The electric motor apparatus according to claim 8, wherein the aperture is closed when the cover is securely mounted to the conduit box body.

11. The electric motor apparatus according to claim 8, wherein the system comprises first and second switches connected in series along the motor control circuit, the first and second switches being normally open and closed only when the cover closes the aperture.

12. The electric motor apparatus according to claim 11, wherein the first and second switches are disposed at an exterior of the conduit box.

13. The electric motor apparatus according to claim 11, wherein at least one of the first and second switches comprises a cam switch.

14. The electric motor apparatus according to claim 13, wherein the cam switch comprises a spring loaded knob.

15. The electric motor apparatus according to claim 11, wherein at least one of the first and second switches comprises a roller switch.

16. An electric motor apparatus, comprising:
an electric motor;
circuitry coupled to the electric motor for turning the electric motor on and off;
a conduit box through which electricity is transmitted to the electric motor to power the electric motor when the electric motor is turned on, the conduit box including a conduit box body formed to define an aperture and a cover, the cover being attachable to the conduit box body such that the cover closes the aperture; and
first and second switches connected in series along the circuitry, the first and second switches being mechanically timed in accordance with an attachment state of the cover with respect to the conduit box body to prevent transmission of the electricity through the conduit box when the cover is not attached to the conduit box body such that the cover closes the aperture or to permit transmission of the electricity through the conduit box when the cover is attached to the conduit box body such that the cover closes the aperture regardless of whether the electric motor is turned on or off.

17. The electric motor apparatus according to claim 16, wherein the cover is securely mounted to the conduit box body to attach the cover thereto.

* * * * *